Patented Oct. 24, 1922.

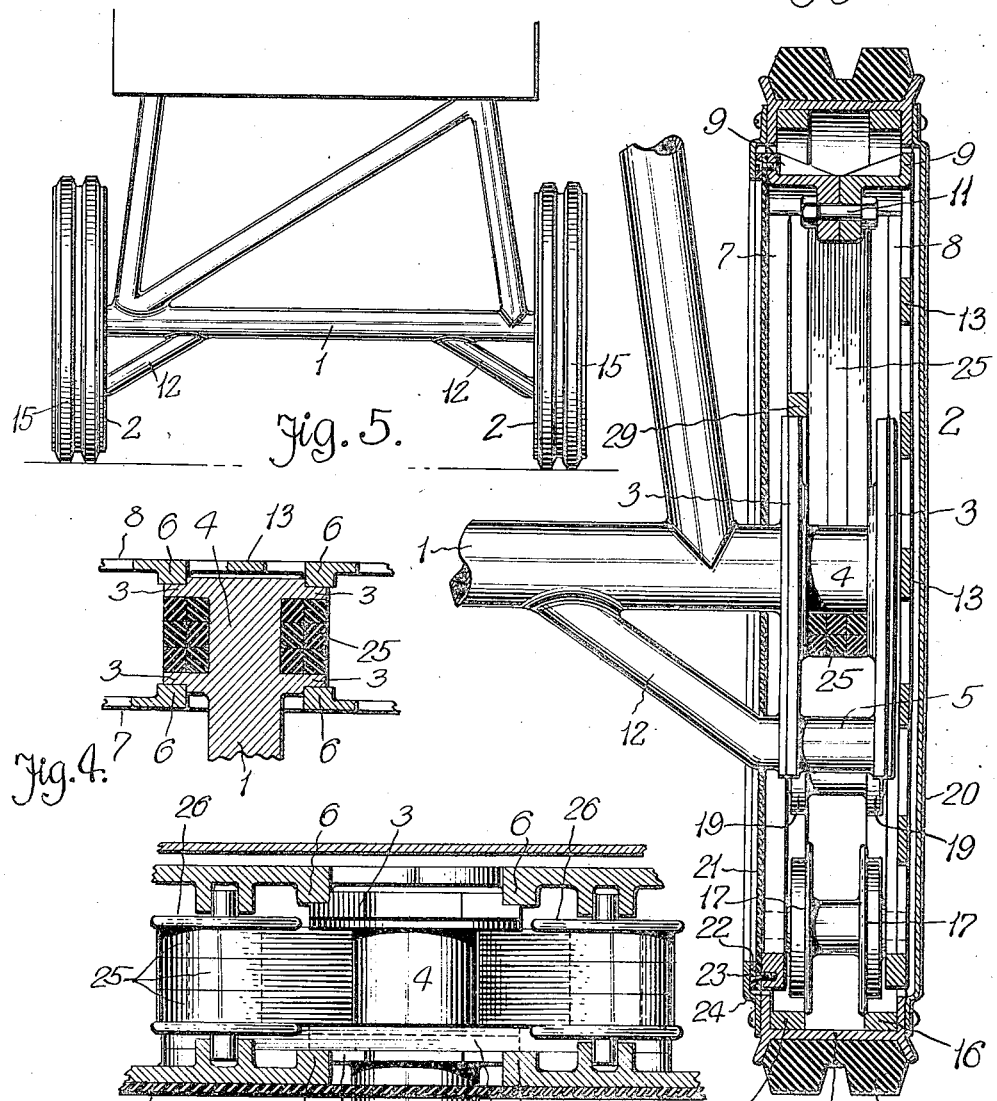

1,432,771

UNITED STATES PATENT OFFICE.

JAMES V. MARTIN, OF ELYRIA, OHIO.

WHEEL.

Application filed March 12, 1918. Serial No. 221,873.

*To all whom it may concern:*

Be it known that I, JAMES V. MARTIN, a citizen of the United States of America, residing at Elyria, in the county of Lorain and State of Ohio, have invented certain new and useful Improvements in Wheels, of which the following is a specification, reference being had to the accompanying drawings.

The ground wheels of an aeroplane are subjected to very severe lateral strains and to heavy shocks due to its coming into contact with the ground at high speeds, and much difficulty has been experienced in providing wheels sufficiently light for the purpose and yet having sufficient rigidity to withstand those strains, and also having the necessary resiliency to relieve both wheels and chassis from the severe shocks incident to landing.

An object of this invention is to provide wheels for this purpose which, while they are light in weight and durable, have great strength to resist crushing and lateral strains and offer the maximum of resiliency to absorb shocks and to yieldingly support the chassis. A further object of the invention is to provide a construction wherein the wheels, upon coming into contact with the ground, may have an extended upward movement relative to the fixed chassis axle, thereby bringing the lateral thrust of the axle upon each wheel near the point at which it is in contact with the ground, and to provide certain other new and useful features in the construction and arrangement of parts, all as hereinafter more fully described and particularly pointed out in the appended claims, reference being had to the accompanying drawings, in which—

Fig. 2 is a transverse vertical section through the same;

Fig. 3 is an enlarged section substantially upon the line III—III of Fig. 1;

Figure 1:
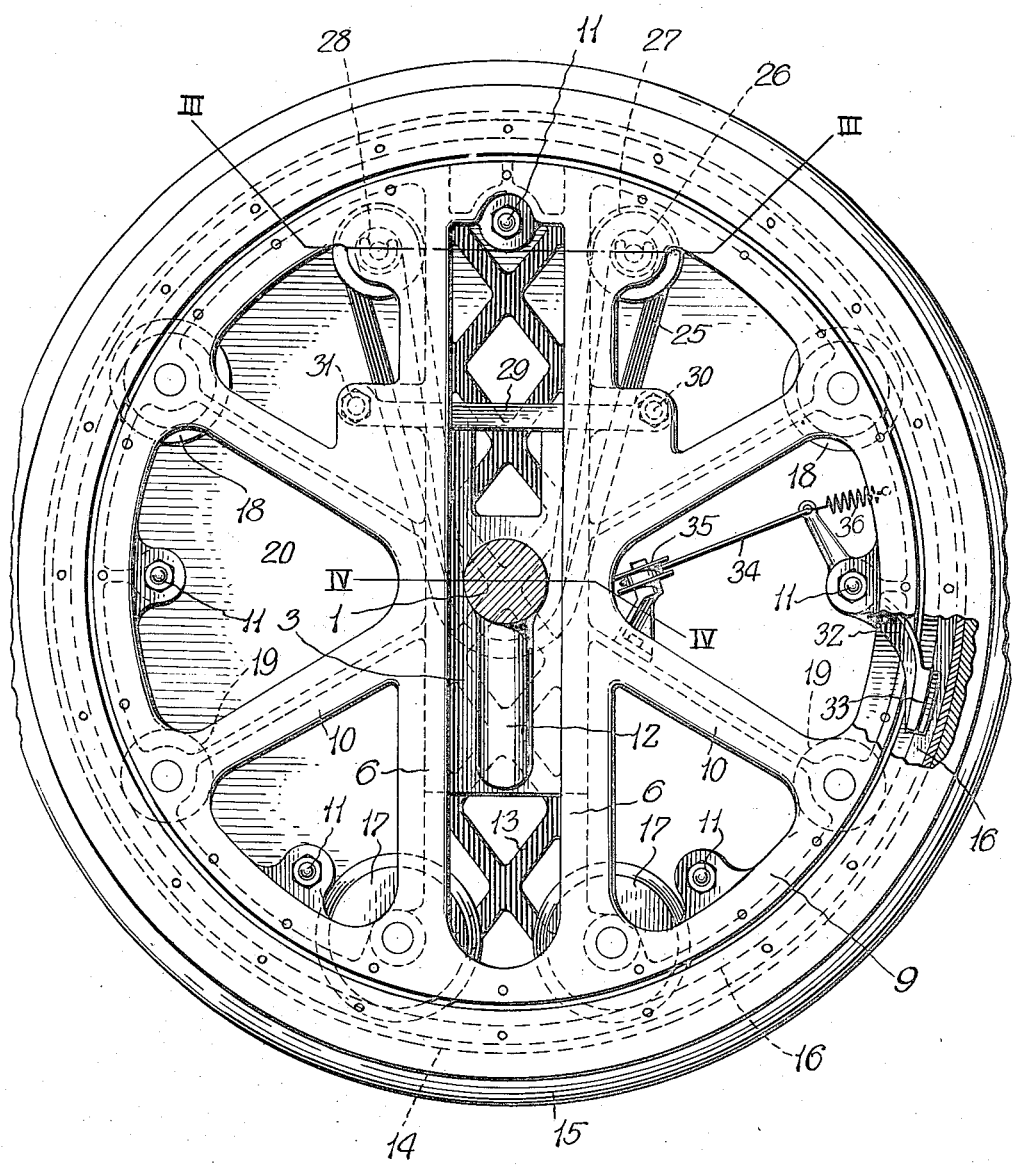
Fig. 1 is a side elevation of a wheel illustrative of the invention, showing the inner side thereof, and an axle therefor in section.

Fig. 4, a similar sectional detail substantially upon the line IV—IV of Fig. 1; and Fig. 5 is an end elevation of a portion of an aeroplane chassis with wheels embodying the invention in place thereon.

As shown in the drawings, the aeroplane chassis includes a fixed or dead axle 1 upon the ends of which the ground or supporting wheels, indicated as a whole at 2, are mounted, and each end of this axle is formed with a head extending transversely of the longitudinal axis of the axle in a perpendicular position, said head comprising parallel plates or members 3 connected by a cylindrical portion 4 and web 5, said plates 3 extending a considerable distance above and below the plane of the axle and formed to slide freely in guide slots or ways 6 extending diametrically of the web or fixed center portion of the wheel which web is formed in two parts, one part 7 forming the inner side of the wheel and the other part 8 forming the outer side. These parts 7 and 8 are preferably cast or otherwise formed to provide mating peripheral rim or flange portions 9 and radially extending members 10 corresponding to spokes connecting the rim portion and the guides 6, said guide, spoke and rim portions of each half of the body or fixed center portion of the wheel, together forming an open circular frame or web, and when these two parts 7 and 8 are secured together by bolts 11 passing through openings in said parts and mounted upon the end of the axle with the head of the axle freely slidable in said guides 6, said web parts together form a fixed or non-rotatable wheel body which is securely held upon the axle head by the engagement of said head between the guides 6 of the two halves of the wheel body. The lower end of the axle head formed by the connected plates 3, is strengthened by a brace or diagonal arm 12 formed integral with the lower end of the plate and the lower side of the axle, and for the purpose of strengthening the outer half 8 of the wheel body, the guides 6 thereof are connected by tie bars or lattice work 13 outside of the plane of the end face of the axle head.

Surrounding the wheel body and spaced therefrom, is a rim 14 which is preferably of channel shape in cross-section with a suitable tire 15 secured in any suitable manner upon the outer side thereof. Within the channel rim at the angles thereof are metal strips forming parallel tracks 16 engaged by flanged rollers or wheels 17 and 18 positioned between the halves of the wheel body to turn freely in bearings thereon, the peripheries of said wheels or rolls projecting at one side beyond the periphery of the wheel body through openings in the flanges 9 provided therefor, into rolling contact with the tracks 16 on the rim. The rim is thus centered upon the wheel body by the rolls to turn freely thereon when the tire comes into contact with the ground and the flanges on the rolls engaging the adjacent sides of the parallel tracks 16, securely hold the rim in place upon the body. The rolls 17 located at the lower side of the wheel body or web are preferably of larger diameter than the rolls 18 as they carry the greater proportion of the load and are subjected to the heaviest lateral strains in use. Other rolls 19 without flanges may be provided to run upon the tracks 16 if desired, and any suitable number of both plain and flanged rolls may be provided.

To exclude the dust and dirt from the interior of the wheel, a thin sheet metal disk 20 is secured in any suitable manner at its periphery to the outer edge of the wheel rim 14 to turn therewith and form a closure for the outer side of the entire wheel. The inner side of the wheel, or that into which the axle projects, may be closed by a suitable diaphram 21 of rubber or other flexible material provided with openings through which the axle extends and secured at its peripheral edge portion to the rim portion 9 of the inner part 7 of the fixed body or web, by a ring 22 held in place by screws 23. A ring 24 secured to the inner edge of the rim 14 overlaps the ring 22 to close the joint between the rim and the wheel body. Upon movement of the axle in the guides 6, the diaphragm 21 will yield sufficiently to permit such movement or the diaphragm may be provided with a slot or opening to permit such movement of the axle.

To yieldingly support the axle within its guides 6 in the wheel web, a plurality of endless elastic bands 25 or members of other suitable resilient material and construction are supported and carried upon the wheel web or body by passing suitable rolls 26 through the looped ends 27 of the bands and engaging the roll shafts in the open bearings 28 provided therefor on the wheel body, the intermediate portions of the bands being passed beneath the cylindrical portion 4 connecting the plates 3 of the axle head. The entire weight of the axle and chassis is thus suspended from the upper portion of the wheel body by these elastic bands, the axle head sliding freely in the ways 6 but being resisted in its downward movement by the bands and limited in its upward movement in the ways by a stop bar 29 detachably attached at 30 to the wheel body at one side of the ways 6 to extend across the ways in the path of upward movement of the axle head, said bar being pivotally secured to the body or web at the opposite side of said ways at 31. This stop bar is so placed that when the axle is in contact therewith, the longitudinal axis of said axle will coincide with the axis of the wheel. The bands 25 are preferably proportioned so that they will normally hold the axle head against its stop bar but will yield under heavy loads or shocks, permitting the head to move downwardly in its guides.

By releasing one end of the stop bar 29 and turning it out of the path of the axle head, said head may then be moved into the upper end of the guides by jacking up the axle, thus removing the load from the bands 25 which may then be quickly and easily removed for replacement or repair by lifting the rolls 26 from their open bearings 28.

The use of a plurality of elastic bands as the resilient supporting means for the axle, permits of an extended flexing movement which is desirable for the purpose, to take up the extreme shock of landing, and as the axle moves downward in its guides which extends nearly the full vertical diameter of the wheel body, the strains and side thrust are put upon the wheel near the point of its contact with the ground, and thus the liability of breakage of the wheel is minimized.

It is desirable to provide means for braking the wheels to retard the progress of the machine after landing, and for this purpose a lever 32 is pivoted intermediate its ends between the parts 7 and 8 in such a manner that a shoe 33 on one end of the lever may ride upon the tracks 16 of the rim 14 when turned into contact therewith by any suitable means such as a cable 34 attached to the inner end of the lever and passed over a pulley 35 and out through the body of the wheel to be led to the fusilage where the same may be conveniently operated by the pilot. A spring 36 normally holds the lever 32 turned with its shoe out of contact with the wheel rim.

A wheel which is light in weight and yet very strong in construction is thus secured by the arrangement of two webs or body members bolted together, and the construction of wheel with an inner non-rotatable body and outer rim rotatable thereon, further adds to the rigidity of construction and lends itself to the enclosing of the wheel against dust and dirt.

Obviously the rolls 17 and 18 may be dispensed with if found desirable and other changes in the construction and arrangement of parts may be made without departing from the spirit of the invention, and I do not therefore, limit myself to the form or arrangement of parts shown.

What I claim is,—

1. A wheel comprising a rotatable part and two non-rotatable parts, said non-rotatable parts guided upon each other for vertical movement and wrapped by elastic material to resist the said movement, one of the said non-rotatable parts being secured to the axle, 2. In combination with a vehicle wheel, two non-rotatable, shock absorber parts and elastic bands resisting the separation of the said parts.

3. A resilient support for a wheel comprising two non-rotatable portions, substancially within the tire faces of the said wheel, directionally opposed parts of each of the said non-rotatable portions provided with flanges and rounded parts between the said flanges, and elastic bands wrapped around the said rounded parts and adapted to resist separation of the said parts.

4. A wheel comprising a non-rotatable body provided with a vertical guide way, a rotatable wheel part encircling said body, a non-rotatable wheel carrying member slidable in said guide way, and a plurality of detachable elastic loops to suspend said member from said body, said body and member being provided with smooth curved portions to engage within the loop ends of said elastic loops, said elastic loops being located between the planes of the side faces of the wheel.

5. A wheel comprising an inner non-rotatable body, a non-rotatable axle, means for yieldingly supporting the axle upon the body, a rim surrounding the body, a disk secured to the outer side of the rim and enclosing said body and outer end of said axle, and a flexible diaphragm secured to the body adjacent its periphery and at the inner side thereof, and having an opening through which the axle extends to form a closure for the inner side of the wheel, which closure is adapted to yield to permit relative movement of said axle and body.

6. A wheel comprising a non-rotatable body formed of two parts with a vertically extending diametral guide opening in each part, an axle having a vertically elongated head engaging said guide openings and held between said parts, means for yieldingly supporting the axle upon the body, a stop for limiting the upward movement of the axle in said guide openings, said stop being adapted to be moved to permit such upward movement, and a disk forming a continuous unbroken surface closing the outer side of the body and covering the outer end of the axle.

In testimony whereof I affix my signature in the presence of two witnesses.

JAMES V. MARTIN.

Witnesses:
T. K. BRYANT,
J. T. DOWLING.